Oct. 13, 1953     E. W. NILSSON     2,655,194
APPARATUS FOR PROCESSING ROUND BARS AND TUBES
Filed Oct. 31, 1946     7 Sheets-Sheet 1
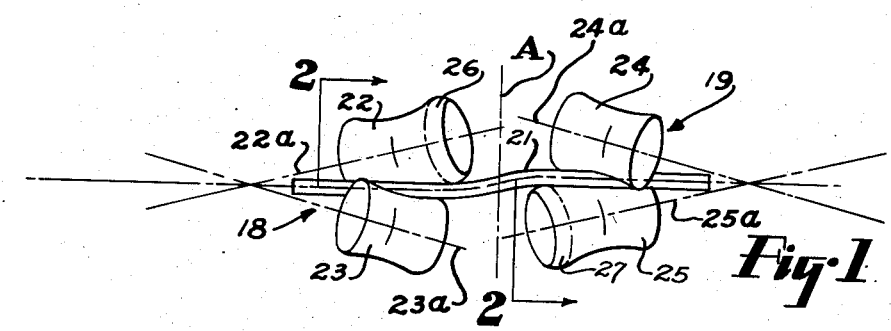
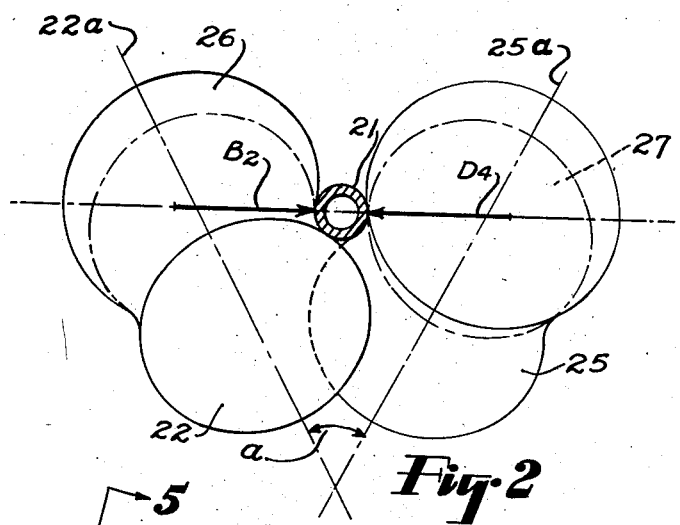
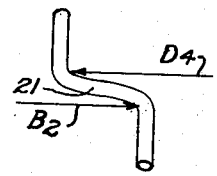
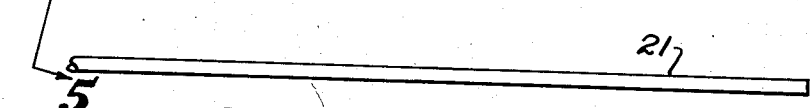
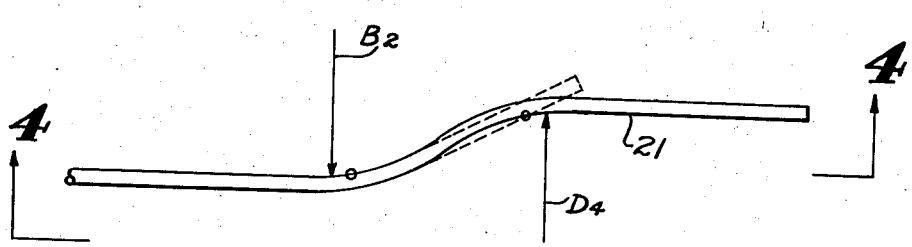
INVENTOR.
EINAR W. NILSSON
BY *Fay Golrick & Fay*
ATTORNEYS

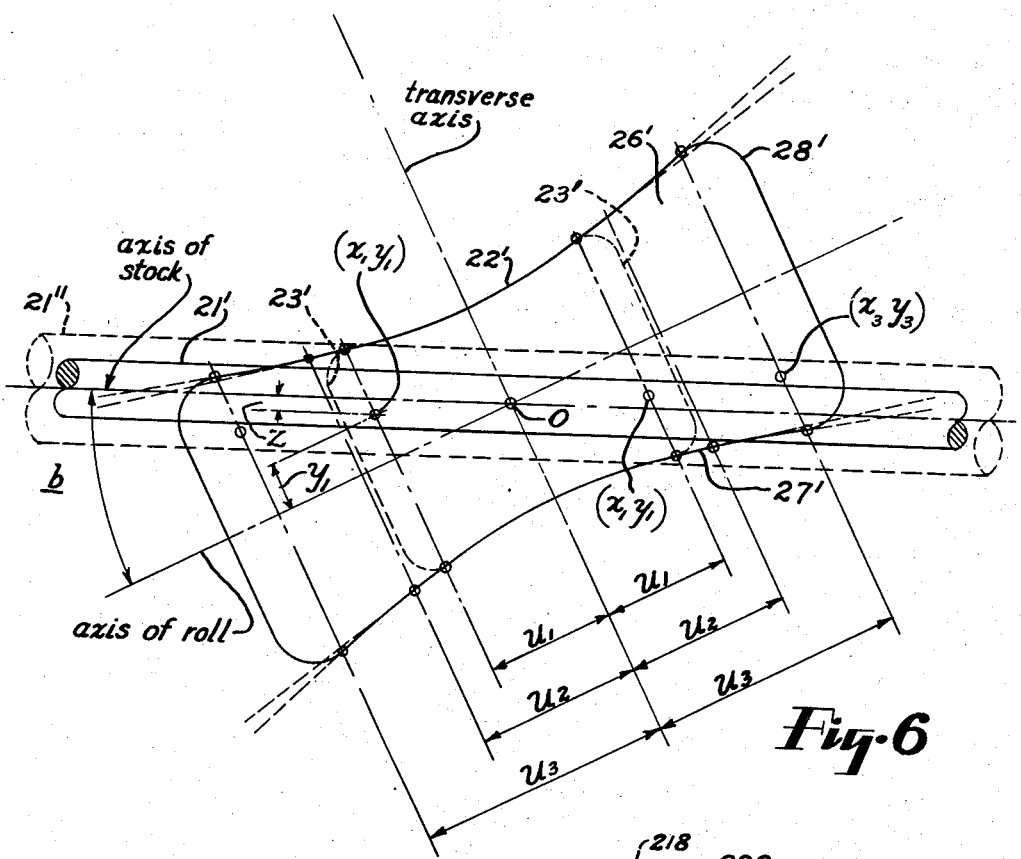
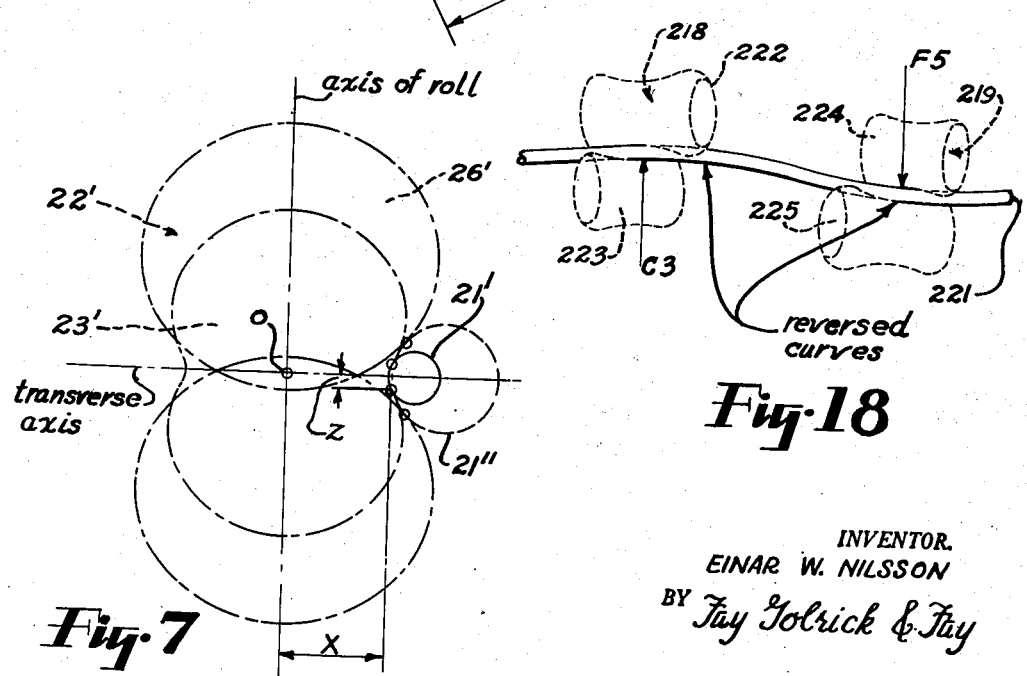

Oct. 13, 1953           E. W. NILSSON           2,655,194

APPARATUS FOR PROCESSING ROUND BARS AND TUBES

Filed Oct. 31, 1946                          7 Sheets-Sheet 3

INVENTOR.
EINAR W. NILSSON
BY Fay Golrick & Fay
ATTORNEYS

Oct. 13, 1953  E. W. NILSSON  2,655,194
APPARATUS FOR PROCESSING ROUND BARS AND TUBES
Filed Oct. 31, 1946  7 Sheets-Sheet 4

INVENTOR.
EINAR W. NILSSON
BY *Fay Golrick & Fay*
ATTORNEYS

INVENTOR.
EINAR W. NILSSON
BY Jay Golrick & Jay
ATTORNEYS

Oct. 13, 1953  E. W. NILSSON  2,655,194
APPARATUS FOR PROCESSING ROUND BARS AND TUBES
Filed Oct. 31, 1946  7 Sheets-Sheet 6

INVENTOR.
EINAR W. NILSSON
BY *Fay Golrick & Fay*
ATTORNEYS

Oct. 13, 1953     E. W. NILSSON     2,655,194
APPARATUS FOR PROCESSING ROUND BARS AND TUBES
Filed Oct. 31, 1946     7 Sheets-Sheet 7

INVENTOR.
EINAR W. NILSSON
BY *Fay Golrick & Fay*
ATTORNEYS

Patented Oct. 13, 1953

2,655,194

UNITED STATES PATENT OFFICE 2,655,194

APPARATUS FOR PROCESSING ROUND BARS AND TUBES

Einar W. Nilsson, Youngstown, Ohio

Application October 31, 1946, Serial No. 706,845

9 Claims. (Cl. 153—103)

The present invention relates to apparatus for processing metal stock such as round bars and tubes, and more particularly to apparatus for straightening such stock.

An object of the present invention is to provide a machine for straightening round bars and tubes and like stock by revolving and passing the stock through two sets of rollers which have restraining passes therethrough and which are arranged so that the axes of the passes are non-aligned whereby the stock passing between the rollers is flexed and stressed. In the use of a machine as described, a more uniformly abrupt deflection of the stock is attained with a minimum of power being utilized.

Another object of the invention is to dispose the axes of the rolls of succeeding passes so that adjacently located external forces transmitted by the stock from one set of rolls to another set of rolls act substantially in the same plane whereby no additional guides other than the rolls themselves will be necessary to maintain the stock between the rolls as it is passed through the apparatus.

A further object of the invention is to provide a straightener of the character referred to in which all of the principal working rolls may be driven so that there will be no appreciable frictional torque that will tend to force the stock out of its intended pass.

A further object of the invention is to provide for rolls of unequal size in each of succeeding passes—in a reversed proportion—so that the larger roll in one pass is succeeded by a smaller—on the same side—in the next pass in order that the roll sizes may be in proportion to the external forces transmitted to them by the flexure of the stock.

Still another object of the invention is to provide only two sets of opposed rolls in the apparatus where the lengths of the opposed rolls for each pass are unequal but where each roll is identical to a roll in the other pass on the opposite side of the stock whereby the forces transmitted by the stock from one set of rolls to the other set are of the same magnitude and the distance between the points of action of said external forces may be reduced to a minimum at adjacent ends of said passes, in order to obtain a more abrupt flexure as the stock passes from one roll set to the next.

Still another object of the invention is to provide a roll in at least one of the sets of rolls of such form that the stock leaving the pass between the set will be deflected about a curved end surface of the roll.

Still another object of the invention is to provide an apparatus for straightening round bars and tubes and like stock in which the opposed rolls of each set of roll passes can be adjusted simultaneously to accommodate stock of different diameters so that the axes of such stock will remain in the same position relative to the feed entrance of the apparatus for stock of different sizes.

A still further object of the invention is to provide an apparatus of the character described in which one set of rolls may be translatably shifted relative to another set for increasing or decreasing the offset of the passes of the rolls and at the same time to vary the skewed relationship of the axes of the rolls of one set of rolls relative to the axes of another set of rolls. Another object of the invention is to provide an apparatus for processing round stock by revolving and passing it through at least two sets of rolls, each set consisting of two oppositely mounted concave rolls, said two sets of rolls having non-aligned work retaining passes whereby the stock passing between such rolls may be compressed, flexed and stressed, said sets of rolls being disposed about the stock in such manner that the mean compression in one pass is circumferentially offset in relation to the mean compression in the other pass, whereby the stock will not be subjected to compression in the same transverse direction in each of such passes at the same time. This feature is of particular importance in the straightening and rounding of thin walled tubing which is frequently subject to undesired deformation when processed in accordance with ordinary procedures.

Other objects and advantages of the invention will be apparent from the following description of a preferred embodiment of the invention, reference being made to the accompanying drawings wherein:

Fig. 1 is a schematic plan view of the rolls in a round bar or tube straightening apparatus, the relative positions of the rolls being shown to give an exaggerated flexure to the bar being straightened;

Fig. 2 is a view taken along line 2—2 of Fig. 1 but on an enlarged scale;

Fig. 3 is a diagrammatic view showing the bar of Fig. 1 under flexure as it passes through the apparatus, and certain force reactions are indicated in approximate direction.

Fig. 4 is a view taken along line 4—4 of Fig. 3;

Fig. 5 is a view taken along line 5—5 of Fig. 4 and includes a force diagram;

Fig. 6 is a view in elevation of a roll and stock for illustrating how the contours of the rolls used in my invention may be developed;

Fig. 7 is an end view of the roll shown in Fig. 6;

Fig. 18 is a schematic plan view of another form of rolls for passing stock through curved passes.

Figure 8:
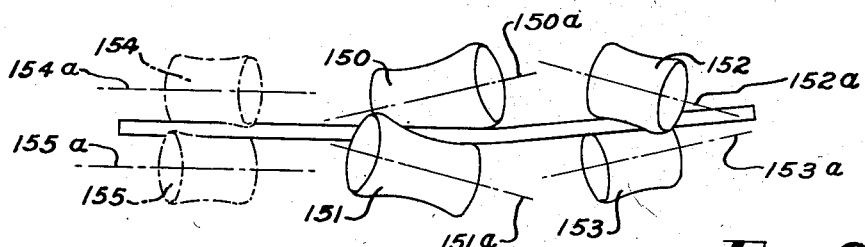
Fig. 8 is a schematic plan view of an alternate arrangement for the rolls.

In the preferred form of my invention, I employ at least two sets of rolls, each set comprising two rolls arranged with the axes thereof in parallel planes, but pitched relative to one another, and contoured so that a pass is formed between the rolls in which a substantial length of the cylindrical shape stock passing therebetween is engaged. The rolls thus form restraining passes and move the stock through these passes while at the same time revolving the stock. The passes may be straight or they may be curved, as desired. The sets of rolls are positioned so that the axes of the passes are slightly out of alignment whereby the stock is required to flex in passing from one set to the next. Thus, the stock is flexed over adjacent roll end surfaces which are substantially parallel and thereby straightened with the use of a minimum of power and by the use of a relatively simple apparatus.

In Figs. 1 to 5, I have illustrated a feature of the invention by showing, diagrammatically, two sets of rolls, 18 and 19, positioned to straighten a tube 21. The set 18 is comprised of rolls 22 and 23 and the set 19 is comprised of rolls 24 and 25. The rolls of each set are contoured and the axes, which are designated by the numeral corresponding to the respective rolls but having a suffix $a$, are pitched relative to one another so that a substantial length thereof will grip the stock 21 to cause the same to pass therebetween in an axial direction toward the right, as viewed in Fig. 1, and at the same time the stock is caused to rotate about its longitudinal axis. The contour of the rolls may be determined in any suitable manner, but I prefer to form them according to the formulas described hereinafter.

Figure 13:
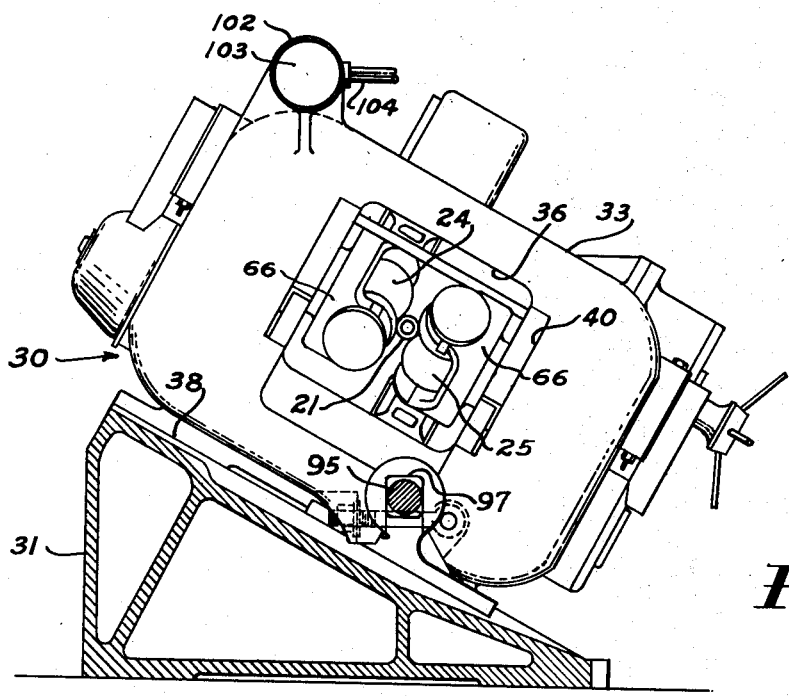
Fig. 13 is a view in section taken along line 13—13 of Fig. 9.
Figure 12:
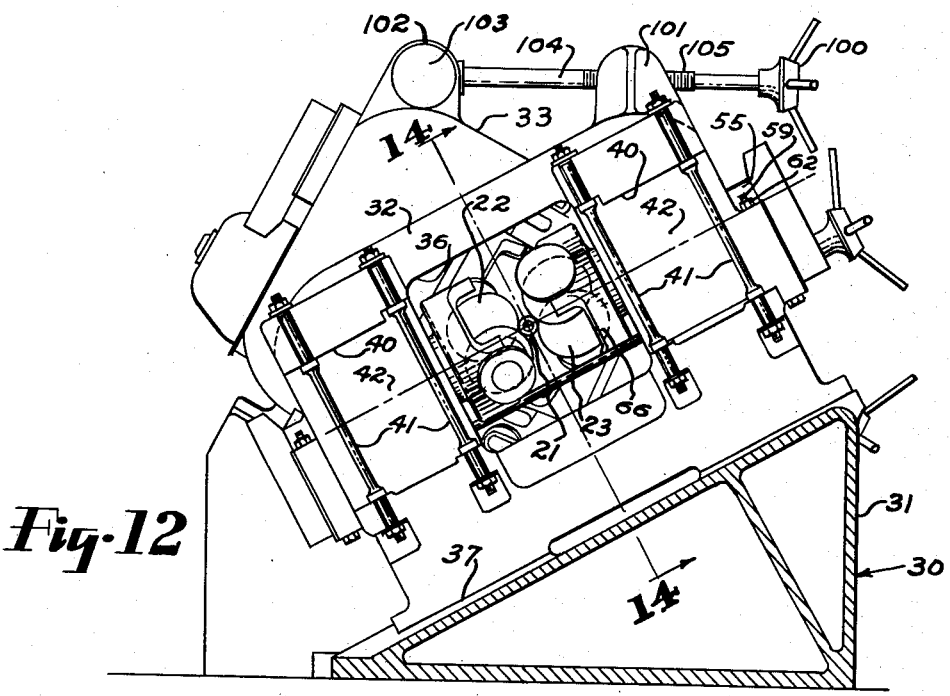
Fig. 12 is a view in section taken along line 12—12 of Fig. 9.

The axes of the two rolls of the respective sets of rolls lie in planes parallel to one another, as may be seen in Figs. 12 and 13, but the axes of the rolls of each set are pitched angularly relative to one another. The set of rolls 18 is offset slightly relative to the set of rolls 19 so that the axes of the passes for the stock 21 between the two sets of rolls are offset slightly whereby the stock will be flexed as it passes from one set of rolls to the other. This may be seen in Fig. 1 where the flexure is shown in an exaggerated degree in order to illustrate the invention more clearly.

All of the rolls have similar contours, except that rolls 22 and 25 are longer than rolls 23 and 24 and substantially parallel to the axis of the stock passing therebetween, and the inner end portions of rolls 22 and 25 are contoured as indicated at 26 and 27, respectively, so that as the stock 21 leaves the restraining pass formed between the first set of rolls 18, it will be flexed about contour 26 of roll 22, and after entering the restraining pass between rolls 24 and 25, the stock will be flexed about contour 27 of roll 25. These contours enable the stock to be flexed abruptly but without the possibility of grooving or otherwise damaging the stock due to heavy pressure between the stock and rolls resulting from the flexure. Also, it will be noted that the larger rolls, i. e., rolls 22 and 25, are subjected to greater stresses than the other rolls.

The contour of the rolls may be determined in any suitable manner so as to form an unbroken line of contact with a straight section of stock. For example, in determining the contour for rolls 23 and 24 and the contour of the central portion of rolls 22 and 25, for stock of a given average size, the rolls are generated according to the following formulas, reference being made to Figs. 6 and 7 in which in outline 22' a roll similar to rolls 22 and 25 is illustrated. Stock 21' is similar to stock 21 in relative size.

$$R = x \cdot \sqrt{1 + \frac{[2r-(x-Ro)]\cdot(x-Ro)}{[r-(x-Ro)]^2 \cdot \text{Sec.}^2 b}}$$

$$u = \sqrt{[2r-(x-Ro)]\cdot(x-Ro)} \cdot \left\{ \frac{x}{[r-(x-Ro)]\text{ Sec. }b} + \text{Sec. }b \right\} \cdot \text{ctg. }b$$

$$y = \frac{x}{[r-(x-Ro)]\text{ Sec. }b} \cdot \sqrt{[2r-(x-Ro)]\cdot(x-Ro)}$$

$r$ represents half the diameter of the stock; $Ro$ represents half of the diameter of the roll at its minimum diameter; $b$ the roll angle (the angle formed between the axis of the stock passing between the rolls and the axis of the roll); $x$ represents the distance from the longitudinal axis of the roll to a point where contact is made with the stock; $y$ represents the distance from a plane through the transverse axis and the longitudinal axis of the roll to the point of contact with the stock; $R$ represents half of the diameter of the roll at a point $(x-y)$ on the surface of the roll where it contacts the stock; and $u$ represents the distance to this point from the minimum diameter of the roll.

The contours of rolls 23 and 24 will correspond to the central portions of the rolls 22 and 25, and these contours are illustrated at 23' by dotted lines. The outer portions 26' of rolls 22 and 25 are determined according to the same formulas set forth previously with respect to the central portion with the exception that the diameter of the stock is assumed to be larger than the average stock to be used, for example. This assumed stock is illustrated at 21". The portion of roll outline 22' indicated by 27' may be a conical section and it interconnects the two contoured portions just described, by surfaces tangent to the contoured portions. The extreme end portions 28' may be of any suitable contour such as a spherical section. Rolls 22 and 25 are contoured as described with reference to roll outline 22' except that they have but one end portion similar to the portions 26', 27' and 28'.

As may be seen in Fig. 1, the extended, contoured end 26 of roll 22 extends toward the roll set 19, and the extended, contoured end 27 of roll 25 extends toward the roll set 18. The sets of rolls are skewed relatively to one another so that the angle between the parallel planes in which the axes of rolls 22 and 23 lie are disposed at an angle $a$ with the parallel planes in which the axes of rolls 24 and 25 lie. This angle is shown in Fig. 2 and it is determined so that the last portion of contact of roll 22 with the stock 21 is substantially 180° to the first portion of contact of roll 25 with the stock. This 180° relationship of the end portions of contact may vary slightly, depending upon the size of the stock and the amount of deflection. The skewed relation of the sets of rolls is illustrated by comparison of Figs. 12 and 13.

When the stock 21 passes through the sets of rolls, a force B2 will be exerted on it as indicated in Figs. 2 and 3 by the contoured end 26 of roll 22, and a similar force D4 reacting in the opposite direction but in the same plane as force B2 will be set up on the bar by the portion 27 of roll 25. These opposed forces can be caused to lie in substantially the same plane by establishing the angle $a$ as described. Thus, by forming the rolls as described, and skewing one set relative to the other, the opposed major reactions on the stock resulting from the flexure lie in substantially the same plane so that there will be no tendency for the stock to leave the roll passes and the usual guides may be dispensed with. Furthermore, complete working of the stock may be effected with a minimum of rolls and the sets of rolls may be located adjacent one another whereby substantially the entire end portions of the stock can be worked. It will be noted by reference to Fig. 1, for example, that the stock is flexed conversely symmetrically relative to the line A normal to the axes of the passes and intermediate the passes. If the contact point between roll 22 and the stock, at the roll's minimum diameter would be considered located at zero angularity, then the angle of application of force B2 on the stock will be approximately $\frac{1}{2}a$ or about 30 degrees from the first mentioned point and D4 would be applied at approximately $\frac{1}{2}a$ plus 180 degrees or 210 degrees to the first mentioned point, depending on the size of the rolls and the angular inclination of their axes, stock size, etc. In ordinary straighteners a reaction produced by the initially contacted roll of a subsequent set of rolls and corresponding to D4, would be angularly disposed on the stock at less than 180 degrees (by the angle $a$), and would tend to bend the stock under the pass line; while a reaction, D4 of an angular disposition of more than 180 degrees and less than about 270–290 degrees would wedge the stock between the contact points of rolls 22 and 23 in Fig. 1. Thus angle $a$ should always be more than 0 degrees and less than about 150 degrees, and the most favorable angle $a$ may be derived from the condition that the adjacently located major reactions B2 and D4 lie in approximately the same plane.

The particular significance of said major reactions being disposed at 180 degrees may be even more appreciated, when thin wall tubing is being processed, inasmuch as the magnitude of the resultant reactions will be less than for any other angular relationship between them, and thus will have less of a tendency to flatten such tubing. In addition, the power required for the process will be minimized and the strength of supporting brackets, etc., may be reduced proportionately.

It will be apparent that the contact between the rolls and stock will be in a helical line on the rolls and that the relative positions of the rolls of each set longitudinally of the stock will have an effect on the resultant forces between the stock and the rolls. It is, therefore, desirable that the position of the rolls be adjustable longitudinally of the stock so that for stocks of different characteristics, the rolls may be positioned so that the stock will be restrained in the passes in a plane common with the plane of flexure of the stock. The portions of major reactions, however, resulting from the flexure alone, lie in the same plane and will thus have no component pointing out of the pass of the stock and said skewed relationship between the axes of the two sets of rolls is of particular importance when the first end of the stock is deflected by roll 27 and will have a tendency to travel in the direction indicated by the dotted lines in Fig. 3.

Referring now to Figs. 9 through 17, I have shown a round bar and tube straightener 30 which is a preferred form of embodiment of the invention. It is to be understood that certain elements or parts of the apparatus are not shown in detail as such parts can be of conventional construction and their detailed showing would tend to obscure the disclosure. This straightener includes a base 31 that supports roll frames 32 and 33 and end housings 34 and 35. The frames 32 and 33 support the roll sets 18 and 19, respectively, and the end housings 34 and 35 contain the driving mechanism for the roll sets and they also support the inlet and outlet guides for the stock to be processed.

Frames 32 and 33 are similar to one another, and they are rectangular in shape and each have a rectangular opening 36 through the central portion thereof in which the rolls are located. As may be seen in Figs. 12 and 13, frame 32 rests on a sloping surface 37 of the base 31 to which the frame is bolted by bolts, not shown. Frame 33 is pivotally mounted on surface 38 of the base 31, as will be described in detail hereinafter, which surface slopes in the opposite direction of surface 37. The angle formed between the surfaces 37 and 38 is approximately that of angle $a$ referred to hereinbefore, and the openings 36 are in alignment. The opposite ends of the frames 32 and 33 have an opening 39 in which devices for supporting the rolls in the frames are mounted, and one side 40 of each frame is open. Preferably, the open sides are reinforced by the bolts 41.

Figure 15:
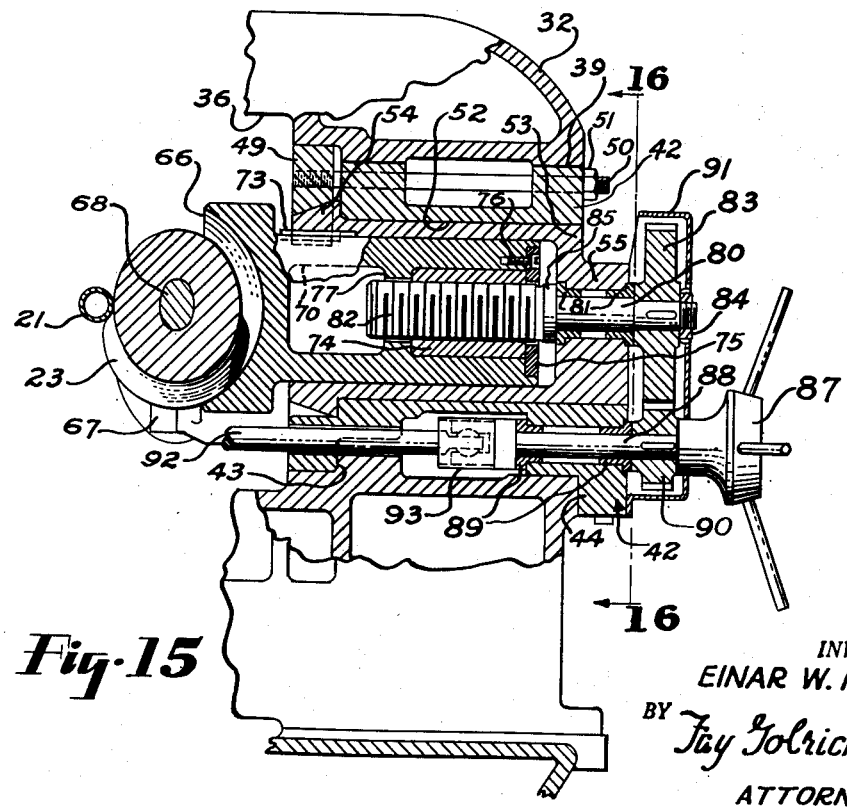
Fig. 15 is a fragmentary view partly in section taken along line 15—15 of Fig. 14.
Figure 16:
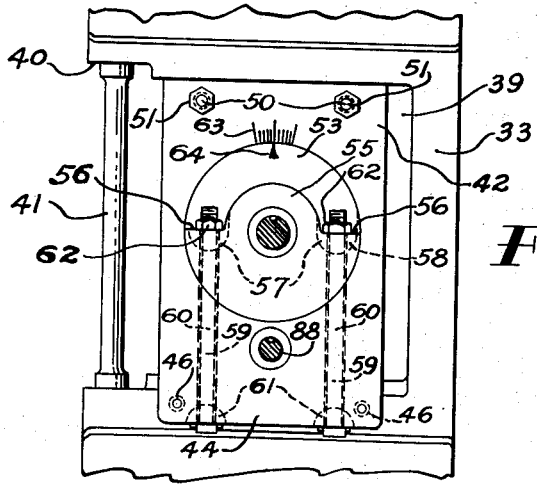
Fig. 16 is a view in section taken along line 16—16 of Fig. 15.

The devices for supporting each of the rolls is similar, and referring to Figs. 15 and 16, which clearly show the device for supporting roll 23, as an example of the construction of the devices supporting rolls 22, 24 and 25, a journal block 42 is frictionally secured in opening 39 so that its position longitudinally of the path of travel of the stock can be adjusted for the purpose explained hereinbefore. The inner and outer ends of the lower portion of the block 42 have flanges 43 and 44, respectively, which engage cooperating ledges on the frame 32. Two set screws 46 are threaded in flange 44 and engage the frame to clamp the lower part of the block to the frame. The upper part of the block is clamped to the frame by a wedge member 49 having two bolts 50 extending through openings in the block, the bolts being drawn outwardly by nuts 51 threaded thereon. It will be seen that by loosening set screws 46 and nuts 51, the block 42 can be shifted to the right or left, as viewed in Fig. 16, and then secured in such shifted position by tightening these screws and nuts.

The central portion of the block 42 has a cylindrical opening 52 therethrough and a sleeve member 53 is fixed therein against axial movement in the opening 52 by a cone-shaped shoulder 54 surrounding the inner end of the sleeve member, which shoulder is pressed into tight engagement with the portion of the block 42 about the inner end of opening 52 by the wedge 49. The outer end of the sleeve member 53 has a neck portion 55, and, referring to Fig. 16, the neck portion has lands 56 on each side thereof in which semicylindrical depressions 57 are formed. Semicylindrical washers 58 nest in the depressions 57 and bolts 59 extend upwardly from the lower side of block 42 through bores 60 in the block and through the washers 58. The heads of the bolts, which are at the lower ends thereof, engage semicylindrical washers 61 resting in similarly shaped recesses in the block, and nuts 62 are threaded on the upper end of the bolts and engage washers 58. By adjusting the positions of the nuts 62, the angular position of the sleeve member 53 relative to block 42 can be controlled, and, preferably, indicia 63 is provided on the block 42 with which a pointer 64 on the sleeve member cooperates to indicate the relative, angular position.

The roll 23 is supported on a yoke 66 which, in turn, is supported in sleeve member 53. The yoke 66 includes two bracket members 67, clearly shown in Fig. 14, in which the axle 68 of the roll 23 is journalled by two roller bearings 69. The yoke 66 also includes a stem 70 which fits into sleeve 53 so that it may move axially therein, but rotative movement about its axis is prohibited by a key 73. The stem 70 is hollow and it includes a cell in which an internally threaded cylindrical block 74 is secured by a retaining ring 75 secured to the end of the stem by screws 76. The inner end of the block 74 is pressed against an annular flange 77 by the force of the ring and the block is prevented from rotating by friction.

The yoke stem 70 is adjustable longitudinally in sleeve member 53 by a rod 80 which is journalled in the neck 55 of the sleeve member by bushings 81 and which has an enlarged threaded portion 82 that is threaded into the block 74. The outer end of the rod 80 has a gear wheel 83 keyed thereto which is secured to the rod by a nut 84 threaded on the end of the rod. Endwise movement of the rod 80 is prohibited by engagement of a shoulder 85 and the gear wheel 83 with the bushings 81, respectively. It will be seen that rotating rod 80 one way or the other will cause the stem 70 to be moved longitudinally in sleeve member 53 by cooperation of the threaded rod 80 with the threaded block 74. Thus, the roll 23 may be adjustably positioned in a direction normal to the axis of the stock handled by the roll and thereby the diameter of the pass between rolls 22 and 23 can be regulated.

Preferably, the rod 80 is rotatable by a handwheel 87 which is secured to the end of a rod 88 journalled in bushings 89 in block 42. A gear 90 is keyed to rod 88 and it meshes with and drives gear 83 which is keyed to rod 80. Thus, by turning handwheel 87, the diameter of the stock pass can be changed. Preferably, gears 83 and 90 are enclosed by a cover 91 secured to block 42. According to my invention, the position of the yoke for supporting roll 22 relative to the axis of the stock can be simultaneously changed in the same degree by providing an identical structure for supporting that roll and driving the gear corresponding to gear 90 by a rod 92 which is connected with rod 88 by a universal joint 93 and which extends from one end of the frame to the other. The universal joint permits slight shifting of the opposed rolls longitudinally of the stock. It will be understood that the threads on the rod of the supporting device for roll 22 which corresponds to rod 80, are of opposite hand so that the rolls 22 and 23 will be moved toward or away from one another, depending on the direction of rotation of hand wheel 87. Rolls 24 and 25 are supported by similar devices and rotation of handwheel 87' will cause movement of these rolls to vary the diameter of the pass therebetween.

By the construction described, it will be seen that the position of the rolls along the axis of the stock can be adjusted; the tilt or pitch of the axis of the rolls can be adjusted; and the diameter of the passes between the rolls can be adjusted without shifting the axes of the passes.

Figure 11:
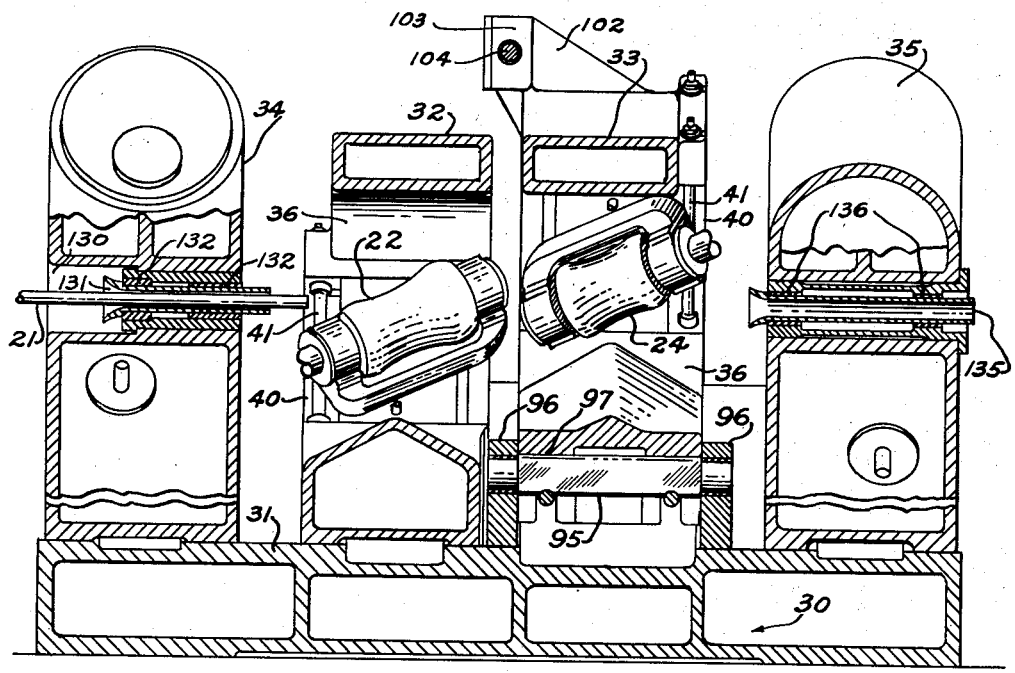
Fig. 11 is a view in section taken along line 11—11 of Fig. 9.

The frame 33 is pivotally supported adjacent one end thereof by a shaft 95 journalled at opposite ends in pillow blocks 96 secured to the base 31, as may be seen best in Fig. 11, and supporting the frame by a bearing surface 97 formed in the latter. The position of frame 33 about its pivot may be adjusted by a mechanism including a handwheel 100 so that the axes of the passes between the respective sets of rolls can be offset as desired. The mechanism comprises arms 101 and 102 formed on each of the frames 32 and 33, respectively. The arm 102 has a cylindrical block 103 pivotally supported therein and one end of a rod 104 is rotatably secured in the block. The rod 104 has a threaded portion 105 that is threaded in an opening through a cylindrical block 106 pivotally supported in arm 101. The handwheel 100 is secured to the rod 104 and it will be seen that the rod is moved longitudinally to swing frame 33 on its pivot by cooperation of the threads of the rod with the block 106. Thus, the set of rolls 19 can be moved as a unit relative to the set of rolls 18 and in doing so, the degree of offset between the axes of the stock passes can be adjusted as desired. It will be noted that the angle $a$ will also be varied as the frame is tilted.

Figure 9:
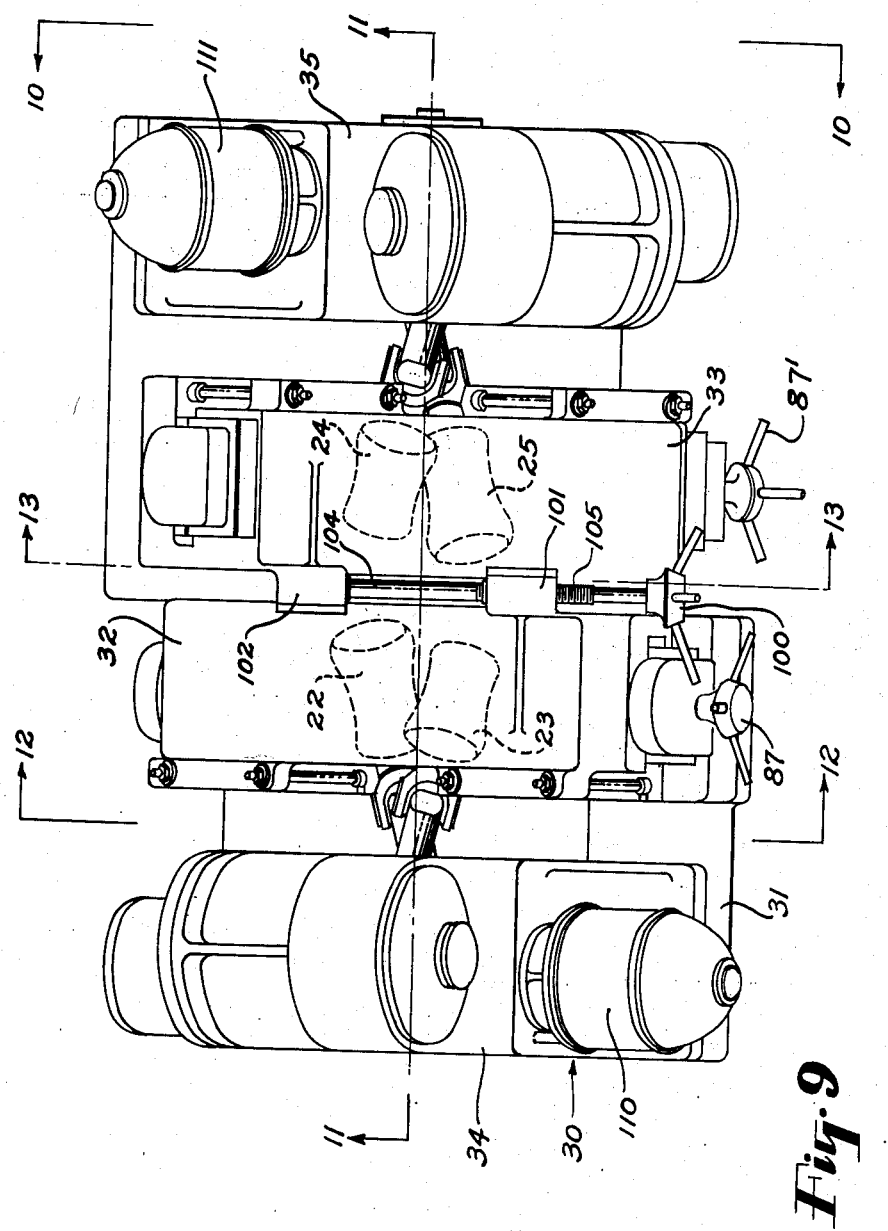
Fig. 9 is a plan view of the round bar straightener referred to with reference to Fig. 1.
Figure 10:
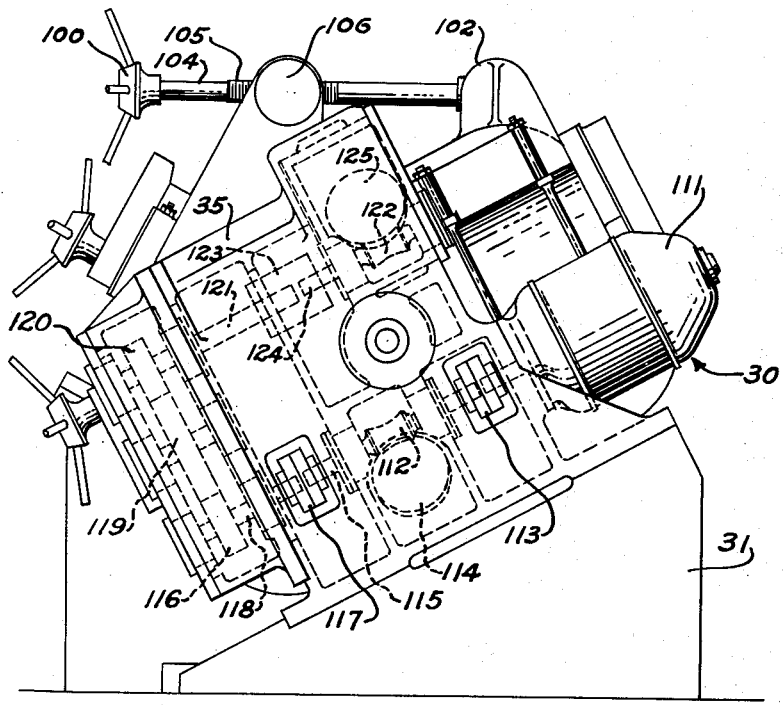
Fig. 10 is a view taken along line 10—10 of Fig. 9.
Figure 14:
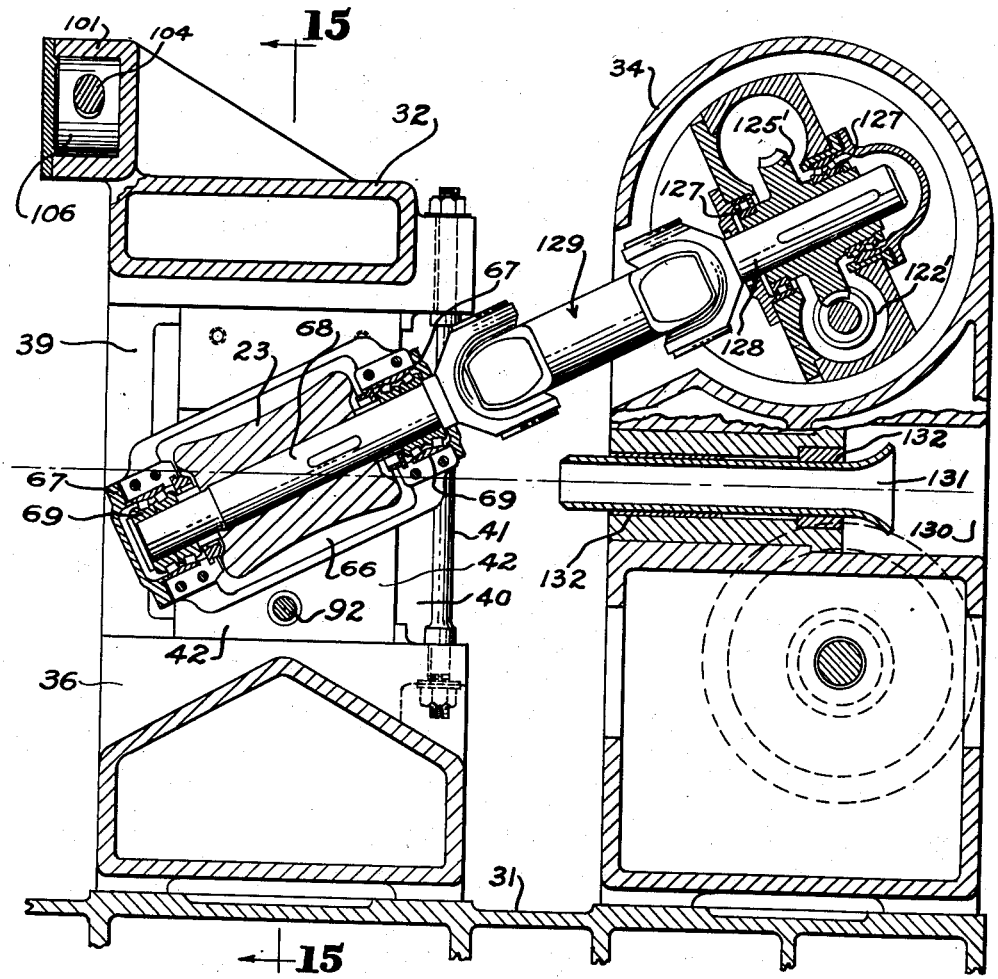
Fig. 14 is a view taken along line 14—14 of Fig. 12 but on an enlarged scale.

In the embodiment of the invention shown in Fig. 9, the rolls 22 and 23 are driven by an electric motor 110 and the rolls 24 and 25 are driven by an electric motor 111. The drive mechanism between the motors and their respective sets of rolls are identical, and to avoid confusing duplication, reference will be made to Figs. 10 and 14 wherein certain elements of the drive mechanism for rolls 24 and 25 is shown in Fig. 10, and certain other elements of the drive mechanism for roll 23 are shown in Fig. 14, the aggregate of these elements illustrate a complete driving mechanism. Referring to Fig. 10, the drive shaft of motor 111 is connected with a worm 112 through a coupling 113 and from the worm 112 drives a worm gear 114 that is keyed to a shaft, not shown. The worm also drives a shaft 115 that is connected to a pinion 116 through a coupling 117 and shaft 118. The gear 116 meshes with an idler gear 119 which in turn drives a pinion 120, which is similar to pinion 116. The pinion 120 is keyed to a shaft 121 which is connected to a worm 122, through a slip clutch 123, which may be in the form of a fluid clutch, and a shaft 124. The worm 122 drives a worm gear 125 that is keyed to a shaft, not shown. The worms 112 and 122 are similar to one another as are the worm gears 114 and 125 except that one drive is of opposite hand to the other to cause the gears to rotate in the same direction. Thus, it will be seen that the worm gears 114 and 125 will be driven at the same speeds, if the load on gear 125 does not cause slippage in the drive 123. Each gear 114 and 125 is connected in driving relation, respectively, with a roll of the set of rolls 19, gear 114 being connected with roll 25 and gear 125 being connected with roll 24. The connecting members will be described presently. By this arrangement, one of the rolls of the set may rotate slower than the other so that slippage between the roll and stock is obviated in the event there might be a difference in the diameters of the rolls of the set due to uneven wear.

Referring now to Fig. 14, there is shown a worm 122' adapted to drive a gear 125' which gear is journalled in bearings 127 mounted within the housing 34 and keyed to a shaft 128. The shaft 128 is drivingly connected to the axle 68 of roll 23 by a universal joint connection indicated at 129. Gear 125 is mounted in housing 35 similarly to gear 125' and is adapted to drive roll 24 by elements similar to those described with reference to the driving of roll 23. The worm gear 114 is located in the lower portion of the housing 35 and it is mounted with its axis tilted upwardly for connection with roll 25 by elements similar to those described with reference to the drive for roll 23. Likewise, roll 22 is driven by a worm gear mounted in the lower portion of housing 34.

If desired, the motor 110 may be arranged to operate as a generator where a reduction in the stock is effective between rolls 22 and 23 with a consequent elongation of the stock. In that event, rolls 22 and 23 will be driven by passage of the stock therethrough.

The stock is fed into the apparatus through an opening 130 in housing 34, and a sleeve 131 is rotatively supported in the opening by bushings 132. The outer end of the sleeve is flared for facilitating feeding of the stock. A similar sleeve 135 is journalled in bushings 136 in housing 35 and this sleeve is flared at its inner end.

In operation, the stock to be worked enters guide sleeve 131 and is grasped between rolls 22 and 23 and is then rotated and propelled so that it passes between rolls 24 and 25. The stock is flexed as it passes from one set of rolls to the other due to the offsetting of the sets as described. By extending the contoured ends of rolls 22 and 25 inwardly beyond the inner ends of rolls 23 and 24, a more favorable leverage for flexing the stock is obtained so that a minimum of power can be utilized in operating the apparatus. Furthermore, this arrangement permits close spacing of the sets of rolls as the bearings for the inner ends of rolls 23 and 24 do not need to be relatively close, thus affording space for the inner ends of the longer rolls 22 and 25. This arrangement thoroughly works the rod and removes any kinks therein. By utilizing at least two sets of rolls closely disposed to one another, the rods can be straightened substantially to the very ends thereof. By forming the rolls as described, the rod is firmly restrained in the passes and uniform flexure is assured. Also, it will be noted that the formation of the rolls permits each roll to be connected with a driving shaft with a minimum of space being required.

Figure 17:
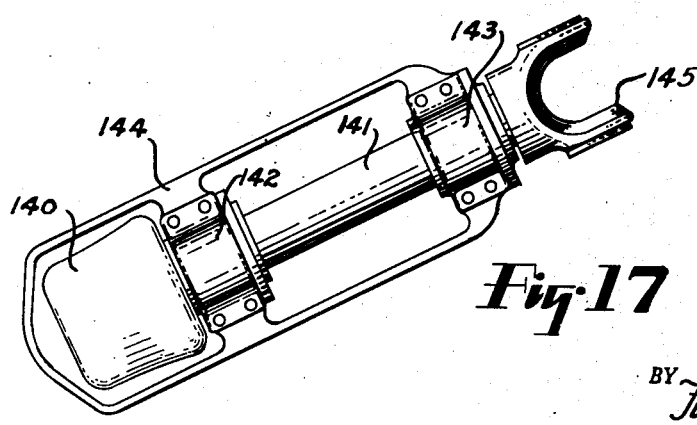
Fig. 17 is an elevational view of a modified form of roll and roll mounting means whereby the roll is supported at one end only and where the roll is relatively short, including only slightly more than one-half of the usual symmetrical concave roll face.

To further reduce the space taken by the rolls, if desired, the rolls could be supported at one end only, and referring to Fig. 17, I have illustrated a roll 140 which is mounted on an axle 141 which in turn is journalled in bearing 142 and 143 formed on a frame 144. The frame 144 is provided with a stem, not shown, corresponding to the stem 70 of the yoke 66 used to support roll 23, so that frame 144 could be supported in the apparatus similarly to the yokes 66. The axle 141 has a universal joint element 145 on the end thereof for connection with the roll driving mechanism. The contours of rolls similar to roll 140 would be as described with reference to rolls 22, 23, 24 and 25.

Instead of arranging the axes of the passes between the roll sets parallel but offset, it may be desirable to dispose the axes at slight angles to one another, as is illustrated in Fig. 8, so that a cantilever principle deflection is achieved. This principle would be useful where severe flexures might produce extreme reactions on the rolls, as when large diameter stock is processed. In this arrangement rolls 150 and 151 are preferably relatively long rolls with contours similar to rolls 22 and 25 and rolls 152 and 153 are shorter rolls. It may be advantageous in some instances to employ a third set of rolls 154 and 155, arranged with their axes lying in planes parallel to the axis of the stock, for restraining the stock.

In the embodiments of the invention described hereinbefore, the passes between the rolls have been straight. It may be desirable to employ curved passes in order to get abrupt deflections for bars of small diameter. In the past, it has been the practice to obtain deflections between rollers by adjusting the anble b for the two opposed rolls so that the angle b for one of the rolls is greater than the corresponding angle for the other roll, the roll disposed at smaller angularity providing a concave side in the pass and the roll disposed at the larger angle forming the convex side in the pass. Obviously such an adjustment produces uneven rotating components on the stock.

By utilizing the method of developing contours for rolls, as illustrated with reference to Figs. 6 and 7, I can provide a curved pass between the rolls while maintaining the angle b for each roll equal whereby uneven rotating components on the stock are avoided and the stock will have no tendency to leave the passes and guides therefore may be eliminated. A further advantage toward achieving stability and a firm grip on the stock is achieved inasmuch as I also can provide for rolls of smooth contours, each consisting of a central contour forming a straight pass for a round body of smaller diameter than the diameter used in forming a straight pass for the outer contours, the central and outer contours to tangent an intermediate contour, the shape of which may be a cone. The shape of these contours may be determined by employing the formulas disclosed hereinabove, but using one size of stock within the range to be processed in computing the outer contours for one roll and the central contour for the opposed roll, while a smaller diameter stock is employed for computing the central portion of the former roll (forming the concave side of the pass) and larger diameter stock is employed for computing the outer portions of the latter roll (forming the convex side of the pass).

For example, I can provide a straight pass, if so desired, with the stock to be processed contacting the outer end portions of one roll and the central portion of the opposed roll (said portions forming contact with a straight cylindrical body), and for a curved pass, if so desired, by narrowing the space between the opposed rolls so that the stock will contact both rolls along portions of the central and outer contours.

On the other hand, it is also possible to provide each of the opposed rolls in a curved pass with contours each figured and generated by employing one stock size only for each roll and by using the same roll angle b for generating both of the rolls. In such case, one roll is generated by a smaller diameter cylindrical body (this roll forming the concave side of the pass) and the other roll generated by a larger diameter cylindrical body (the latter roll forming the convex side of the pass). In the former case, however, the rolls are more suitable for processing stock in a large variety of sizes.

Referring to Fig. 18, I have shown, schematically, two sets of rolls indicated generally at 218 and 219, which rolls are contoured, as just described, to curve the stock in the passes between the rolls. These sets of rolls may be used in the straightening apparatus described hereinbefore. The rolls 222 and 225 are longer than the respective opposed rolls 223 and 224 and the end portions of the rolls 222 and 225 are contoured to deflect the stock 221 in curves about the rolls 223 and 224, as just described. The axes of the rolls of the sets 218 and 219 may be disposed corresponding to the axes of the sets of rolls 18 and 19 described hereinbefore so that it will be apparent that the curvature of the stock between the rolls 222 and 223 lies in a plane disposed at the angle a to the plane in which the curvature of the portion of the stock 221 between rolls 224 and 225 lies. The stock is also flexed as it passes from one set of rolls to the other so that a reverse curve is formed in the stock. It will be observed that the two central reaction forces C3 and F5 will be disposed at an angle to each other corresponding to the angle a when the axes of the rolls in one set have been skewed in relation to the axes of the rolls in the other set as described above, while the near end reactions remain in the same plane as explained with regard to Figs 1 and 2.

It will be understood that two or more other sets of rolls may be used ahead of and after the sets 218 and 219, respectively, to restrain and straighten the stock.

By generating the opposed rolls upon this principle it is possible to set the rolls with the same angularity b and thus maintain substantially even rotating speeds on both sides of the stock in a curved pass. Also, it is possible to maintain the same pair of opposed rolls for obtaining a straight pass, by adjusting the rolls further apart than in the case of the curved pass. This eliminates the tendency of a stock, although it is of small diameter, to climb out of the passes and it is possible to avoid the use of guides.

The curved passes formed as described also enables the stock to be deflected by a more efficient utilization of power due to the fact that the curvature in one pass helps to produce the curved deflection in the next pass, just as in any continuous beam, a load on one span produces a moment and deflection of opposite sign in the neighboring spans.

It is to be understood that the transverse or forward adjustment of both of the opposed rolls in a pass, as described for the preferred form of my invention, is not necessary for a successful operation of the apparatus, but this feature was included in order not to alter the centerline of the entering pass for various stock sizes. A less elaborate construction may be had by omitting the forward adjustment for one roll in each pass, said non-adjustable rolls being located alternately about the sides of the stock in succeeding passes. For instance, referring to Fig. 9, it is possible to omit the forward adjustment for the rolls 22 and 25, securing their respective yokes to the frames 32 and 33 respectively, although still maintaining sleeve member 53 for angular adjustment of the yoke and roll. The screw adjustments would be maintained for rolls 23 and 24, but the spindle 92, Fig. 15, can be omitted for rolls 23 and 22. The adjusting screw 80 and gears 83 and 90 can be omitted for roll 25, and the handwheel 87' with its spindle 92 maintained for operating adjusting screw rod 80 for roll 24 in order that both rolls 23 and 24 may be adjusted from one side of the apparatus.

Having described preferred forms of the invention, it is to be understood that other forms might be adopted, all falling within the scope of the claims which follow.

I claim:

1. A cross roll machine for advancing, rotating and processing round stock, comprising spaced sets of rotatable rolls for engaging longitudinally spaced portions of said stock, a support for each set of rolls, the axes of said rolls being angularly disposed relative to one another and to the stock, said rolls being positioned on substantially diametrically opposed sides of the stock to form a pass for rotating and advancing the latter, the axes of one set of rolls being in skewed relation with respect to parallel planes including the axes of an adjacent set of rolls, whereby the longitudinally spaced portions of the stock engaged by said roll sets are circumferentially offset, and means for adjusting said roll supports relative to each other in a direction transverse to the movement of said stock to effect bending of the stock between the roll sets.

2. A cross roll machine for advancing, rotating, and flexing round stock, comprising spaced sets of rotatable rolls for engaging longitudinally spaced portions of said stock, a support for each set of rolls, at least one of said supports being tiltably mounted, each set of rolls consisting of two rolls the axes of which are angularly disposed relative to one another and to the stock, the rolls of each set being positioned on and engaging substantially diametrically opposed sides of the stock to form a pass for rotating and advancing the latter, the axes of one set of rolls being in skewed relation with respect to parallel planes including the axes of another set of rolls; and means for tilting said one support to provide for offset relation of the passes of at least one roll set with respect to another, the tiltable support having a fulcrum generally parallel to the pass of the corresponding set of rolls and equidistant from the contact point of the stock with the minimum diameter of one said roll of one said set and the contact point of the stock with the minimum diameter of a roll of the other said set.

3. In an apparatus for processing round bar or like stock, a pair of opposed concave rolls forming a pass through which the stock to be processed is longitudinally advanced during rotation thereof, the axes of said rolls being disposed in parallel planes and inclined oppositely with respect to one another and at generally equal angles with respect to the stock, each roll having a central contour shaped to contact stock of one diameter for a predetermined angularity of the axis of the roll to the pass, an outer end contour shaped to contact stock of another diameter for the same said angularity of the axis of the roll to the pass, and intermediate contours tangentially interconnecting said central and outer contours, the central portion of one roll and the outer end portion of the opposed roll being shaped to contact one diameter of straight stock within the range to be processed, the outer end portions of the said one roll being shaped to contact a larger straight round body, and the central portion of the opposed roll being shaped to contact a smaller straight round body, so that the stock to be processed may have a straight pass or may be flexed in a curve between said opposed rolls, as desired, by regulating the space between said opposed rolls; and means for rotating said rolls at substantially the same rate.

4. A roll for forming a pass for round stock, said roll having a central concave contour shaped to contact a substantial longitudinal section of stock for rotating and advancing the stock and having an end contour over which the stock is adapted to be flexed, said end contour comprising a portion of another concave contour, the radius of curvature of such portion at any point thereon being larger than the radius of curvature of said central contour, said central and end contours being joined by a section defined by tangents common thereto.

5. A roll for forming a pass for round stock, said roll having a central concave contour, the generative element of which is of predetermined cylindrical size, the generation being made with the roll and generator axes at a predetermined acute angle to each other, and said roll having a concave end contour the generative element of which is of larger predetermined cylindrical size than said first mentioned size, the generation being made with the roll and generator axes at substantially the same angle as the first mentioned angle, said central and end contours being joined by a region defined by tangents common thereto.

6. A cross roll machine for advancing, rotating and flexing round stock, comprising a pair of concave rolls the axes of which are spaced and inclined to each other and generally inclined to the axis of the stock and contoured to engage said stock therebetween in a pass and to rotate and advance said stock longitudinally when said rolls are rotated; a deflecting roll disposed to engage the stock beyond one end of said pass, the axis of said deflecting roll being disposed in a plane which is oblique with respect to parallel planes including the axes of said pair of rolls so that said deflecting roll initially engages said stock at a point on the side thereof which is substantially diametrically opposite the point of last contact of said stock with a roll of said pair of rolls and in a plane containing said last contact point and the stock axis; and supports for respectively carrying said pair of rolls and said deflecting roll, at least one of said supports being pivoted for tilting movement relative to the other to provide for relative adjustment of said pair of rolls and said deflecting roll in a direction transverse to said pass and thereby provide for adjustment of pressure exerted by said deflecting roll, the tiltable support having a fulcrum generally parallel to the pass of said set of rolls and equidistant from the contact point of the stock with the minimum diameter of one said roll of one said set and the contact point of the stock with the minimum diameter of said deflecting roll.

7. In a device for simultaneously axially advancing and rotating elongated round stock such as metal bars and tubes about its axis, comprising two spaced opposed cross rolls having axes lying in parallel planes and defining therebetween an elongated pass having generally linear circumferentially and progressively axially extending curved regions of contact between said rolls and such stock, such pass extending in angular relation to the axis of each of said rolls; means positioned beyond one end of said pass adapted laterally to engage such stock as the latter progresses through said pass and to exert pressure thereon, said means being operative to exert such pressure in a direction toward the axis of the stock and toward the axis of one said roll where such stock contacts said roll at such end of said pass.

8. In apparatus for processing round stock, a plurality of pairs of opposed concave rolls forming successive non-aligned passes of cross rolls through which the stock to be processed is passed by rotation of the rolls, the rolls of each pair of rolls having similar central contours, and one of the rolls of each pair of rolls being longer and having an additional end contour comprising a portion of another concave contour, the radius of curvature of such portion at any point thereon being larger than the radius of curvature of said central contour, said central and end contours of said longer rolls being joined by a section defined by tangents common thereto, said additional end contours of said longer rolls in adjacent pairs of rolls being directed toward each other and positioned to engage opposite sides of the stock substantially in a plane the location of which is defined as containing the axis of the stock after flexure.

9. A cross roll machine for processing round stock such as metal bars and tubes comprising at least one set of two concave rolls spaced apart to form a rolling pass for the stock their contours being generated to contact the stock on each side of the minimum diameter of each roll with the axes of rotation of said rolls being inclined to that of the stock so that the latter may be fed forward with a rotary motion, said axes of rotation being disposed in substantially parallel planes parallel to the center line of such pass, and another roll adapted to engage such stock near the exit end of and laterally offset from such pass the axis of rotation of said latter roll being similarly inclined to the axis of such pass and disposed in a plane substantially parallel to the axis of such stock; but such axis of said latter roll being inclined relative to the above-mentioned parallel planes at an angle to engage stock emerging from such pass and flexed over the exit end of one of said first-mentioned rolls and the entering end of said latter roll in a plane extending through the center line of such pass and through points of contact of such stock with said exit and entering roll ends.

EINAR W. NILSSON.

(References on following page)

References Cited in the file of this patent

UNITED STATES PATENTS

| Number | Name | Date |
|---|---|---|
| 236,245 | Nuttall | Jan. 4, 1881 |
| 331,572 | Tasker | Dec. 1, 1885 |
| 585,720 | Teetor | July 6, 1897 |
| 594,482 | Medart | Nov. 30, 1897 |
| 1,070,030 | Haas | Aug. 12, 1913 |
| 1,097,281 | Abramsen | May 19, 1914 |
| 1,408,791 | Wolffgram | Mar. 7, 1922 |
| 1,649,204 | Wise | Nov. 15, 1927 |
| 1,791,869 | Idel | Feb. 10, 1931 |
| 1,832,631 | Hartley | Nov. 17, 1931 |
| 1,859,851 | Stiefel | May 24, 1932 |
| 1,892,934 | Coryell | Jan. 3, 1933 |
| 2,132,976 | Siegerist | Oct. 11, 1938 |
| 2,332,803 | Lorig | Oct. 26, 1943 |
| 2,319,785 | Abramsen | May 25, 1943 |
| 2,411,395 | Sutton | Nov. 19, 1946 |

FOREIGN PATENTS

| Number | Country | Date |
|---|---|---|
| 550,633 | Germany | May 12, 1932 |